United States Patent [19]
Bingham

[11] 3,937,882
[45] Feb. 10, 1976

[54] FULL-DUPLEX COMMUNICATION SYSTEM ON A TWO WIRE LINE

[75] Inventor: John A. C. Bingham, Palo Alto, Calif.

[73] Assignee: Vadic Corporation, Mountain View, Calif.

[22] Filed: Apr. 11, 1974

[21] Appl. No.: 460,179

[52] U.S. Cl. ........ 178/69.5 R; 178/58 R; 178/66 R; 179/2 DP; 343/175; 343/179
[51] Int. Cl.² .................... H04L 5/14; H04M 11/00
[58] Field of Search .......... 178/69.5 R, 66 R, 58 R; 179/15 BS, 2 DP; 343/179, 175; 325/15, 49, 50, 67

[56] References Cited
UNITED STATES PATENTS

| | | | |
|---|---|---|---|
| 3,631,497 | 12/1971 | Leonard | 343/179 |
| 3,655,915 | 4/1972 | Liberman et al. | 178/58 R |
| 3,715,496 | 2/1973 | Jones, Jr. | 343/175 |
| 3,758,719 | 9/1973 | Klose | 178/58 R |
| 3,783,194 | 1/1974 | Vilips et al. | 178/66 R |
| 3,801,912 | 4/1974 | Ragsdale | 178/66 R |

Primary Examiner—Joseph F. Ruggiero
Assistant Examiner—Errol A. Krass
Attorney, Agent, or Firm—Lowhurst, Aine & Nolan

[57] ABSTRACT

The disclosed full-duplex communication system includes a pair of full-duplex modems, one at each end of a two wire circuit. Each of the modems includes a transmitter for transmitting over the two wire circuit a stream of synchronous data at a first carrier frequency, and a receiver for receiving over the two wire circuit a stream of synchronous data at a second carrier frequency. The receiver includes means for coherently demodulating the stream of synchronous data. In a preferred embodiment, an asynchronous-to-synchronous converter converts asynchronous input data into a stream of synchronous data for transmission by the transmitter. Also, the preferred embodiment transmits the data and receives the data as double side band suppressed carrier quadrature amplitude modulation. The system includes a remote test capability for automatically looping back test data for comparison with the transmitted test data.

12 Claims, 6 Drawing Figures

Fig-3

Fig_5

Fig. 6

FULL-DUPLEX COMMUNICATION SYSTEM ON A TWO WIRE LINE

BACKGROUND OF THE INVENTION

The present invention relates in general to full-duplex communication over two wire lines and more particularly to such a system employing frequency division multiplexing with synchronous modulation and demodulation so as to achieve a high bit rate in a full-duplex mode of operation.

DESCRIPTION OF THE PRIOR ART

Heretofore, full-duplex communication over two wire lines has been achieved by the use of modems (modulator-demodulators) at either end of the two wire circuit. These modems utilized frequency division multiplexing with asynchronous frequency shift keying modulation and demodulation to achieve simultaneous transmit and receive capability in both directions. Such a system is disclosed in U.S. Pat. No. 3,655,915 issued Apr. 11, 1972.

The problem with this prior art communication system is that the asynchronous frequency shift keying method of modulation and demodulation was relatively wasteful of bandwidth and therefore limited the attainable transmission speed. More particularly, when communicating over conventional telephone lines having bandwidths of 3000 hz, this prior art system, utilizing frequency division multiplexing and asynchronous frequency shift keying, is capable of operating at a maximum data rate of approximately 1.5 times the frequency shift. For 300 bits per second (bps) operation, a 200 Hz frequency shift is required between the "mark" and the "space" in a given channel. In the Bell Telephone model 103/113 data set, the channel assignments are arranged such that the low band has a carrier frequency of 1170 Hz and the upper band has a carrier frequency of 2125 Hz. In each of the low and high bands, the frequency assignments for the "mark" and "space" (1 and 0) are 100 Hz below and 100 Hz above the carrier, respectively. This system therefore has a maximum data rate of 300 bits per second for full-duplex operation. Thus, it is desired to obtain a full-duplex communication system for communication over a standard voice-grade telephone line at data rates substantially above 300 bits per second.

SUMMARY OF THE PRESENT INVENTION

The principal object of the present invention is the provision of an improved full-duplex communication system for establishing communication over two wire lines.

In one feature of the present invention, a full-duplex modem for communicating over a two wire line includes a transmitter for transmitting a stream of synchronous data at a first carrier frequency and a receiver for synchronously detecting or demodulating the stream of synchronous data received at a second carrier frequency, whereby more efficient use of available bandwidth is achieved to allow communication at higher data rates.

In another feature of the present invention, the full-duplex communication system for communication over a two wire line includes, means for transmitting and receiving frequency division multiplexed double side band suppressed carrier quadrature amplitude modulated data at a pair of multiplexed carrier frequencies.

In another feature of the present invention, an input buffer is provided between the source of data and the transmitter for converting asynchronous data to synchronous data for subsequent transmission over the two wire communication line.

In another feature of the present invention, the full-duplex communication system for communicating over a two wire line includes a synchronous modulation-demodulation scheme selected from the group of modulation schemes consisting of, four level frequency modulation, duo binary frequency modulation, single side band amplitude modulation, and double side band suppressed carrier partial response modulation.

In another feature of the present invention, the receiver portion of the modem for achieving full-duplex communication over a two wire circuit includes, a coherent detection circuit for coherently detecting signal data at only a single carrier frequency and a heterodyne circuit at the input to the receiver for heterodyning the input data at either one of a high or low carrier frequency so as to produce a difference frequency at the band pass frequency of the receiver, whereby the receiver need operate at only one band pass frequency.

In another feature of the present invention, the modems include a remote test capability wherein an initiating modem sends a signal that instructs the responding modem to loop data received from the initiating modem and retransmit it back to the initiating modem such that agreement between the transmitted and received data of the initiating modem confirms that the complete link (both modems plus the line) is working correctly.

Other features and advantages of the present invention will become apparent upon a perusal of the following specification taken in connection with the accompanying drawings, wherein:

DESCRIPTION OF THE PEFERRED EMBODIMENTS

Figure 1:
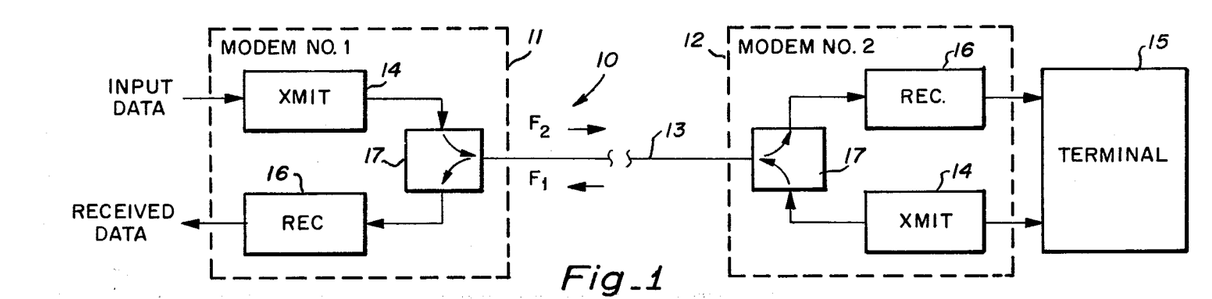
FIG. 1 is a schematic block diagram of a full-duplex communication system for communciation over two wire lines and incorporating features of the present invention.

Referring now to FIG. 1, there is shown a full-duplex communication system 10 for communication over a two wire standard voice-grade telephone line and incorporating features of the present invention. More particularly, the communication system includes a pair of modems (modulator-demodulators) 11 and 12 disposed at opposite ends of a two wire telephone line 13 over which it is desired to establish simultaneous communication in opposite directions. Each of the modems 11 and 12 is essentially identical, each including a transmitter 14 for synchronous transmission of data on one of two carrier bands $F_1$ and $F_2$.

In a preferred embodiment of the system of FIG. 1, the originating modem 11 or 12 transmits in the high band $F_2$, for example, at a carrier frequency of 2150 Hz and receives in the low band, i.e., 1150 Hz. The originating modem includes a receiver 16 for coherently demodulating the low band data at a carrier frequency $F_1$ to provide a received data output. Similarly, the answer modem 12 includes a receiver 16 which is set for receiving and coherently demodulating the upper band $F_2$ carrier data and delivering same to a terminal device 15, such as a computer. Hybrid couplers 17 are provided for coupling the transmitter and receivers in respective modems to the two wire line 13.

Conventional data access arrangements, provided by the telephone company, are used to interface the telephone line 13 to the modems 11 and 12. The data access arrangement, not shown, includes conventional logic circuitry for effecting dialing, answering, billing, busying, etc.

Figure 2:
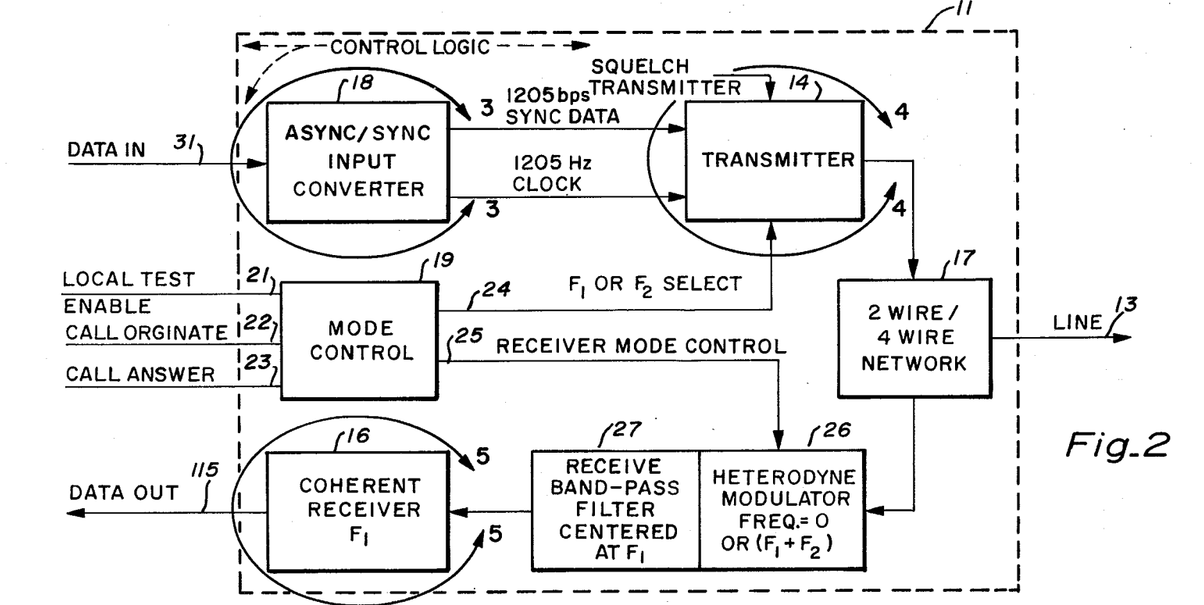
FIG. 2 is a schematic block diagram of a full-duplex modem of the present invention.

Referring now to FIG. 2, there is shown, in block diagram form, the circuitry of one of the modems 11. More particularly, modem 11 includes an asynchronous-to-synchronous input buffer or converter 18 which is shown and described in greater detail in FIG. 3. The asynchronous-to-synchronous converter 18 receives input data in a character format of 7, 8, 9 or 10 bits in asynchronous form and converts the input data into a bit stream of synchronous data for transmission by the transmitter 14. The asynchronous-to-synchronous converter 18 operates by inserting an extra "stop" bit when necessary between characters to approximately synchronize the 1205 bps bit rate of the transmitter 14 with the 1200 bps bit rate of the incoming data.

The output of the asynchronous-to-synchronous converter 18 consists of a bit stream of synchronous data at a bit rate of 1205 bps and a 1205 Hz clock signal which are both inputted to the transmitter 14. The carrier frequency of the transmitter 14 is determined at either the high band or the low band by means of an output of a mode control 19 having three inputs. A first input 21 is a local "test enable" operated from a front panel switch for diagnostic purposes. A second input to the mode control 19 is a "call originate" dial command at 22, and a third input is the "call answer" input 23 which is generated in response to a received ring signal.

In the call originate mode, the mode control 19 sends an output to the transmitter 14 to cause the transmitter carrier frequency to be in the high band, namely at $F_2$. Similarly, a second output 25 of the mode control 19 is fed to a heterodyne modulator 26 at the input of a receive band pass filter 27 centered at the low band carrier frequency of $F_1$. The receiver mode control output 25 selects either a local frequency of 0 frequency or a frequency corresponding to the sum of $F_1 + F_2$ so that the difference frequency at the output of the heterodyne modulator is always centered at $F_1$ depending upon whether the receiver is to receive on the low or high band. More specifically, when the transmitter is transmitting on the high band carrier frequency $F_2$, the receiver 16 is to be receiving on the low band frequency $F_1$. Therefore, the receiver mode control output 25 would be such as to select a 0 frequency signal for the heterodyne modulator 26 for heterodyning with data received from the line 13 via the hybrid coupling network 17.

Receiver 16 receives the double side band suppressed carrier quadrature amplitude modulated signal centered at $F_1$ and demodulates that signal to retrieve the data output. The receiver circuitry 16 is disclosed in greater detail in FIG. 5 but briefly includes a carrier recovery circuit for recovering the carrier signal from the suppressed carrier data and a clock recovery circuit for recovering the clock signal so as to achieve coherent detection for improved signal-to-noise ratio.

Modem 11 can receive input asynchronous data at 1200 bps for transmission and simultaneously receive transmitted data at 1200 bps over a conventional voice-grade two wire telephone circuit. The modem also includes some conventional control logic such as that utilized in the Western Electric model 103 which is a prior art full-duplex modem operating at 300 bps.

Figure 3:
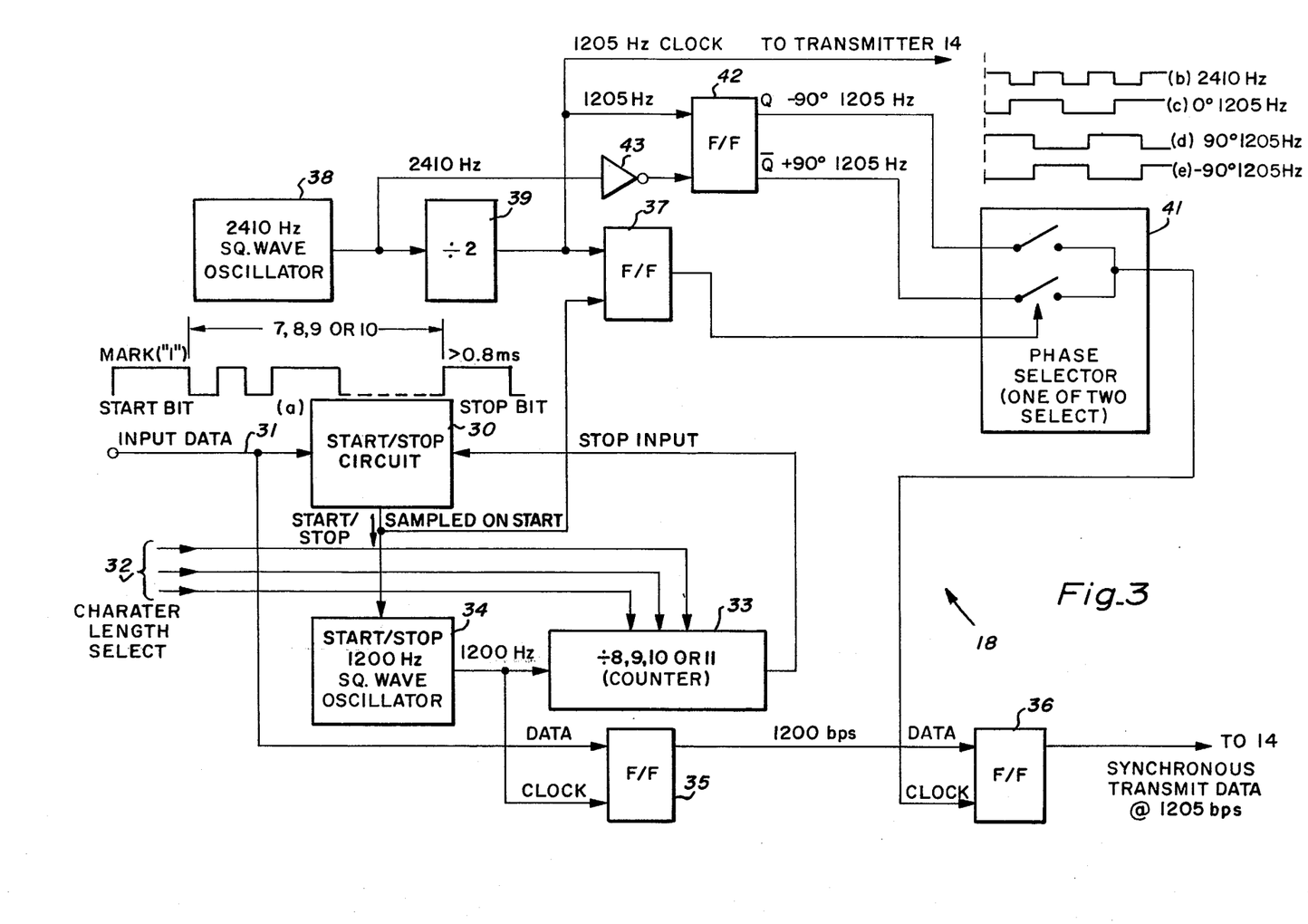
FIG. 3 is a block diagram of an asynchronous-to-synchronous converter delineated by line 3—3 in the circuit of FIG. 2.

Referring now to FIG. 3, the asynchronous-to-synchronous converter 18 is shown in greater detail. Briefly, the buffer converter 18 receives a bit stream of input data in character format at input terminal 31. The character format is indicated in waveform (a) namely, the data is fed to the input of the buffer as a series of characters consisting of either 7, 8, 9, or 10 bits per character, each corresponding to a different code or format. Separate characters are separated by a mark which consists of a logic 1 having a length of at least one bit period followed by a "start" bit which comprises a logic 0 following the mark. Each word is transmitted by a "stop" bit consisting of a logic 1 having a length greater than 0.8 milliseconds. A code selector input is provided at 32 which is selected according to the number of bits to be found in each character according to the predetermined character format or code. For example, if the machine which inputs data to the modem 11 has a character length of 7 bits, that particular format or code input is selected as one of the code inputs at terminal 32 for energizing a bit counter 33 which will recognize the end of each of the characters. Since the bit counter counts the stop bit at the end of each character the corresponding character counter counts one bit higher than the number of bits in the selected character format.

The input bit stream at terminal 31 is fed to one input of a start/stop circuit 30, such as a gate circuit. The start/stop circuit 30 recognizes the start of a character by detecting the start bit following the end of a character and upon recognizing the start bit, starts a 1200 Hz square wave oscillator 34. One output of the 1200 Hz oscillator 34 is fed to one input of the character counter 33 for counting therein according to the character length code provided at input terminal 32. The counter 33 counts the bits and produces an output which serves as an end character recognize signal which is fed back to the start/stop circuit 30 for stopping the 1200 Hz square wave oscillator 34. A sample of the input data at terminal 31 is also fed to one input of a flip-flop 35 and that data is clocked or strobed through the flip-flop 35 via a clock input at 1200 bps derived from the output of the square wave oscillator 34. Thus, the various sequential characters in the input data stream 31 are clocked to the input of a second flip-flop 36.

A second output, of the start/stop circuit, corresponding to only the start output of each of the characters is fed to one input of a flip-flop 37. The second input to flip-flop 37 consists of a 1205 Hz square wave signal derived from a 2410 Hz square wave oscillator 38 via a divider 39. Thus, at the start of each character as recognized by the start input fed to one terminal of flip-flop 37, the flip-flop 37 samples the value of the 1205 Hz clock signal and feeds this sampled value to one input of a phase selector 41. The phase selector 41 serves to select one or the other of opposite phase 1205 Hz square wave clock signals for application to a clock input of flip-flop 36 for clocking the 1200 bps data to the input of the transmitter 14 at the 1205 bps bit rate.

The 1205 Hz square wave signal which is to be phase selected is derived from a flip-flop 42 which has one 1205 Hz input derived from the divider 39 and a second input at 2410 Hz derived from the square wave oscillator 38 via the intermediary of an inverter 43. The 2410 Hz input is of the form shown by waveform (b), whereas, the 1205 Hz input is of the form shown by waveform (c). The output of the flip-flop 42 consists of two square wave signals at 1205 Hz, the first one of the outputs Q being at −90° relative to the 1205 Hz input and corresponding to waveform (e), whereas, the other output is the Q output having a +90° phase shift relative to the 1205 Hz input and corresponding to waveform (d). The two 1205 Hz outputs are applied to the input of the phase selector 41 and one or the other is selected in accordance with the output of the flip-flop 37 such that the phase selected output has a duration lasting until the next start bit of the next succeeding character.

Thus, the asynchronous-to-synchronous converter 18 serves to clock the 1200 bps data to the transmitter 14 at a rate of 1205 bps such that the data is clocked out of the converter 18 at a slightly higher rate than it is received. The phase selector 41 serves to assure that, during a character, a selected phase relationship will endure for the full length of the character. An inherent function of the phase shifting of the clock signal, as obtained at the output of phase selector 41, is that it automatically inserts an extra "stop" bit when necessary between characters to approximately synchronize the 1205 bps transmitted data with the incoming data. If the asynchronous input data is at a bit rate within the range of 40% to 95% of the nominal 1200 bps rated input rate, errors will be introduced by the modem and operation should be avoided in this range. In the input bit rate range of 25% to 40% of the nominal rate of 1200 bps, the modem performance quality is slightly degraded making the communication system more susceptible to terminal timing inaccuracies. Operation at input data rates below 25% of the nominal rated input bit rate of 1200 bps does not significantly degrade performance of the system.

The extra bit which is inserted by the phase selector 42 for converting the asynchronous data to synchronous data comes about due to the switching in the phase selector 41 between an advance and retard phase relationship.

Figure 4:
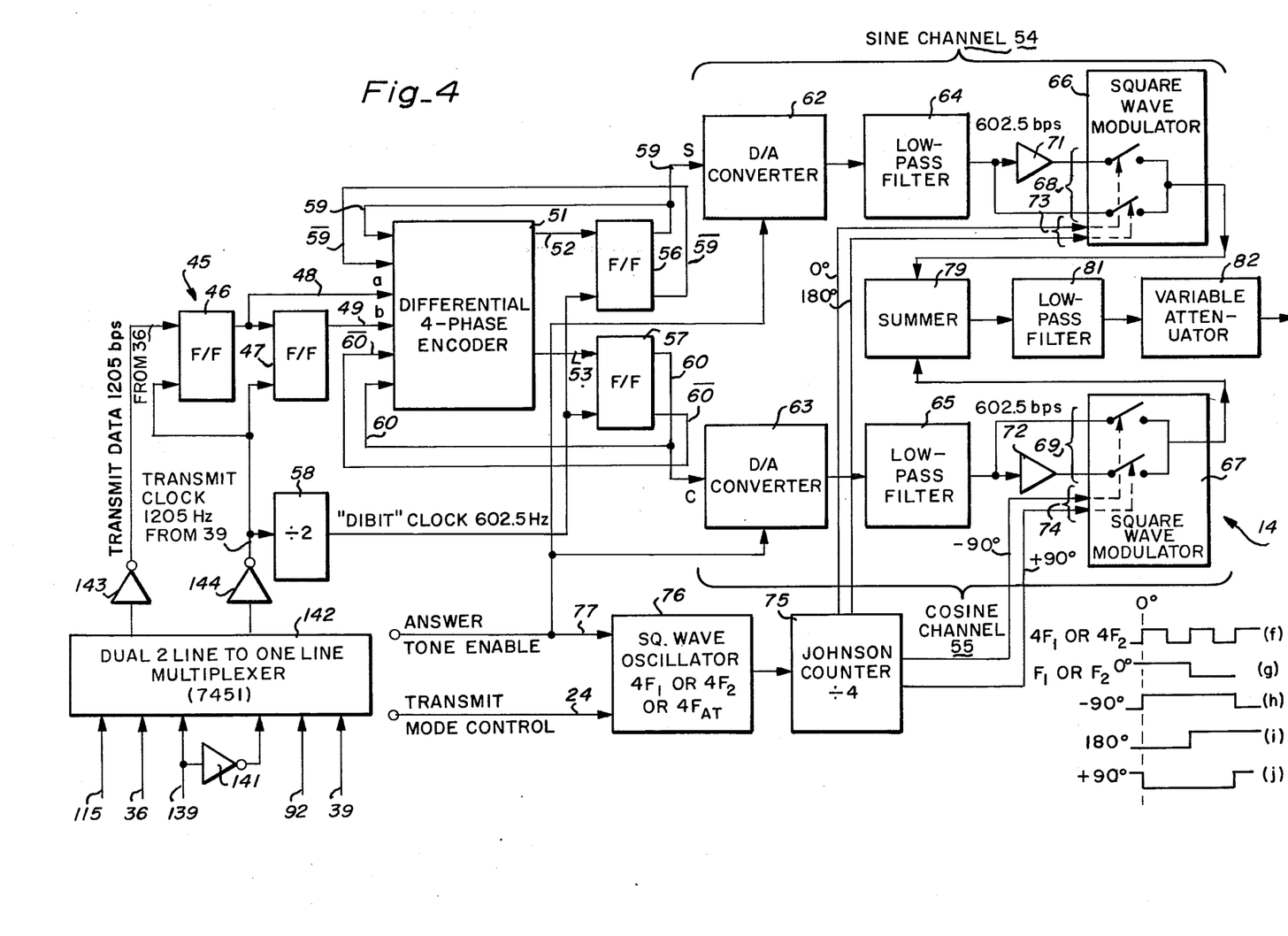
FIG. 4 is a schematic block diagram of a quadrature amplitude modulation transmitter delineated by line 4—4 of FIG. 2.

Referring now to FIG. 4 there is shown, in block diagram form, the circuit for the double side band suppressed carrier quadrature amplitude-modulation transmitter 14. In the transmitter circuit 14, the synchronous bit stream of data at 1205 bps as received from flip-flop 36 is fed to one input of a two bit shift register 45 consisting of a pair of flip-flops 46 and 47. The data received in the shift register 45 is clocked through the shift register by a clock input at 1205 Hz derived from divider 39 (see FIG. 3). The first and second bits of the shift register 45 are fed to first and second inputs 48 and 49, respectively, of a differential four phase encoder 51. The encoder 51 is preferably realized by a dual 4-line-to-1-line data multiplexer such as a TTL type 74153, commercially available from National Semiconductor Inc. of Santa Clara, Calif. In such a physical realization the 74153 is connected as follows: lead 48 to pin 2, lead 49 to pin 14, lead 59 to pins 5 and 12, lead 59 to pins 3 and 10, lead 60 to pins 6 and 11, and lead 60 to pins 4 and 13, where the pin numbers correspond to the pin numbers of the 74153 device. In the output, lead 52 comes from pin 7 and lead 53 comes from pin 9. The differential four phase encoder 51 serves to provide two outputs on lines 52 and 53. The outputs 52 and 53 are clocked at the dibit rate of 602.50 bps into respective sine and cosine channels 54 and 55 via flip-flops 56 and 57, respectively. The dibit clock signal at 602.50 Hz is derived from a divider 58 to which the 1205 Hz clock signal from divider 39 is applied. The sine and cosine outputs, derived from the output of flip-flops 56 and 57, respectively, are applied back to the input of the differential four phase encoder 51 via inputs 59 and 60, respectively.

In each of the sine and cosine channels 54 and 55, bit outputs are derived at the dibit rate of 602.5 bps which are first converted by digital-to-analog converters 62 and 63, respectively, into analog signals which are thence fed through low pass filters 64 and 65, respectively, for removing the high frequency components. The outputs of the low pass filters 64 and 65 are fed to square wave modulators 66 and 67, respectively, via pairs of inputs 68 and 69, respectively.

Each of the input pairs 68 and 69 includes an inverter 71 and 72 in one of the leads for providing inverted sine and cosine analog signals. The sine channel square wave modulator 66 alternately selects the sine or the inverted sine at the carrier frequency. Similarly, cosine channel square wave modulator 67 alternately selects the cosine analog signal or its inverse at the carrier frequency. The switching waveform on the cosine channel square wave modulator 67 is 90° ahead of that on the sine channel modulator 66. Thus, the output of the square wave modulator 66 corresponds to half speed (602.5 bps) encoded data doubled-side band 100% amplitude modulated onto the sine carrier at $F_1$ or $F_2$, whereas the output of square wave modulator 67 corresponds to the half speed (602.5 bps) encoded data doubleside band 100% amplitude modulated onto the cosine carrier at $F_1$ or $F_2$. The 100% amplitude modulation results in suppressed carrier modulation in each channel.

The four phases of carrier inputs 73 and 74 are derived from the output of a Johnson counter 75, the input of which is derived from the output of a square wave oscillator 76. The oscillator 76 operates at any one of three frequencies corresponding to $4F_1$, $4F_2$, or $4F_{at}$ where $F_1$ is the low band carrier frequency, $F_2$ is the high band carrier frequency, and $F_{at}$ is the answering tone for an automatic answering mode of operation within the modem. As previously described with regard to FIG. 2, the control signals for selecting the respective high or low band frequency of the square wave oscillator 76 are derived from the mode control 19 via line 24. The answer tone enable alternative input of the square wave oscillator 76 is also derived from the mode control 19 via line 77.

The output of the Johnson counter 75 consists of $F_1$ or $F_2$ with all possible quadrature phase relations, as derived by division of waveform (f). The outputs corresponding to 0° and 180° (waveforms (g) and (i), respectively) are fed to the input of the sine channel square wave modulator 66, whereas, the output phase relations of −90° and +90° (waveforms (h) and (j), respectively,) are fed to the carrier inputs 74 of the square wave modulator in the cosine channel 55.

The outputs from square wave modulators 66 and 67 are fed to a summer 79 for addition therein to obtain a signal which is the sum of the two 602.5 bps modulated on in-phase and quadrature-phase carriers. This composite analog signal which contains data information at a rate of 1205 bps is fed through a low pass filter 81 to remove frequency components above 3 KHz and thence through a variable attenuator 82 to the two wire circuit 13 via hybrid coupler 17. The nominal output of the transmitter at the output of low pass filter 81, is 0 dbm, namely, 1.1 volts peak into a 600 ohm load, corresponding to 1 milliwatt of output power. The variable attenuator 82 is arranged for attenuating the output power between 0 dbm and −16 dbm, as desired.

The effect of the operations performed by the differential four phase encoder 51, D to A converters 62 and 63, low pass filters 64 and 65, modulators 66 and 67 and the summer 79 is to produce a carrier signal which undergoes a phase change in each dibit period of either 0°, 90°, 180° or 270°. The information to be transmitted is contained in the sequence of phase changes. The modulation scheme of FIG. 4 is thus equivalent to differential four phase modulation described in a text titled Principles of Data Communication, published in 1968 by McGraw-Hill Inc. at pages 246–248. The relation between the input data taken two bits at a time (as dibits at terminals 48 and 49) and the change of the phase of the carrier at 81 is as shown below in Table I. This corresponds to a certain preferred encoding rule but other encoding rules may be employed. However, it is particularly advantageous to encode input dibit 1, 1 as a phase change of 180° because the 180° phase change results in a line signal which is most suitable for initiating carrier and clock recovery during the period of initiating communication between modems when it is conventional to transmit the steady mark pattern, i.e., 1, 1, 1, 1.

TABLE I

| INPUT DIBIT 48 and 49 | CARRIER PHASE CHANGE AT 81 |
|---|---|
| 00 | +90° |
| 01 | 0° |
| 10 | +270° |
| 11 | +180° |

In the automatic answer mode of operation, the modem 11 will recognize a ring signal and answer the call by going offhook and sending the answer tone $F_{at}$. When this happens, the answer tone enable line 77 is energized and an output is derived from the enable line 77 for deenergizing the digital-to-analog converters 62 and 63 in the sine and cosine channels 54 and 55, respectively. This eliminates any modulation of the answer tone carrier which is fed directly onto the output line 13.

Figure 5:
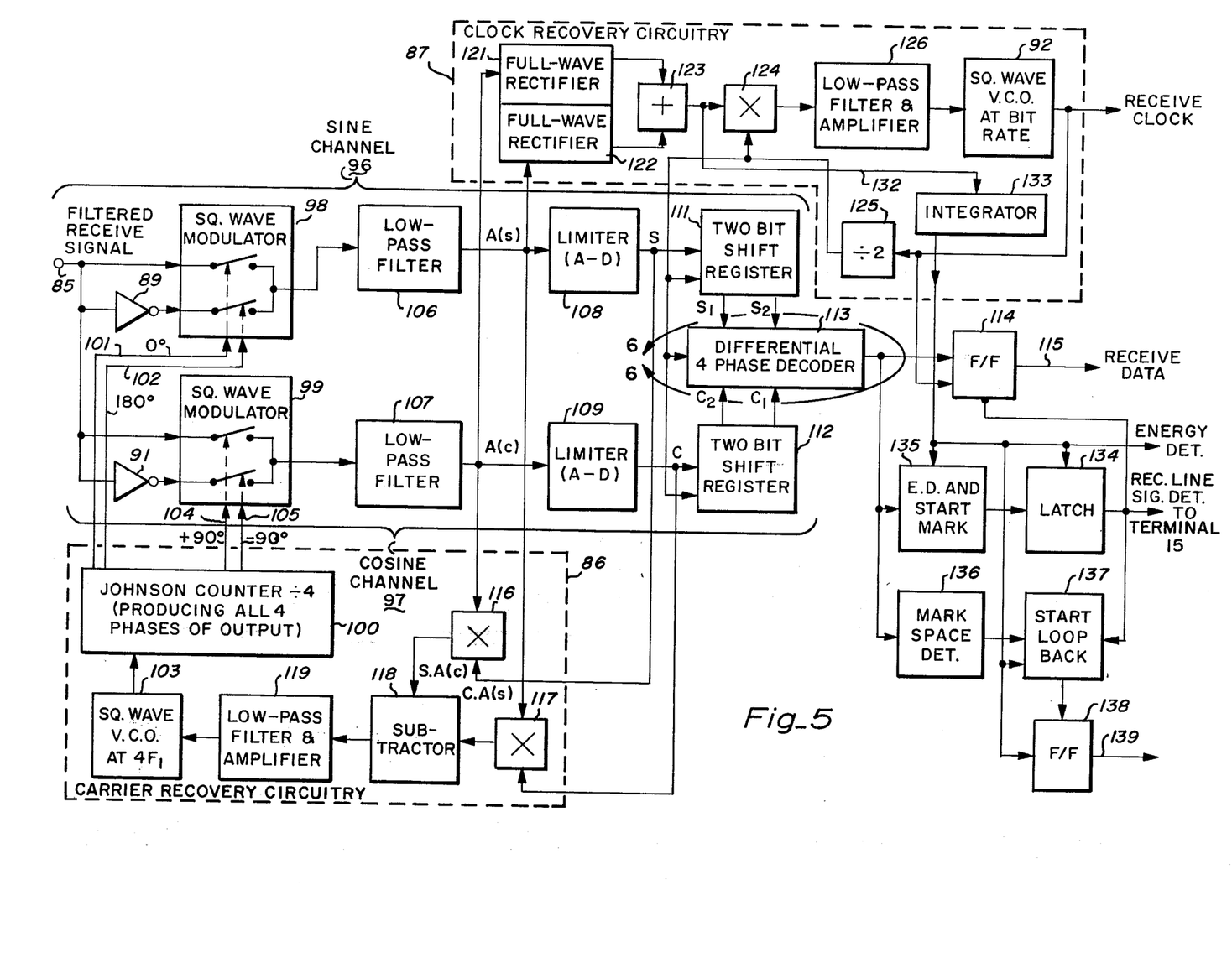
FIG. 5 is a schematic block diagram of a full-duplex coherent detection receiver delineated by line 5—5 of FIG. 2.

Referring now to FIG. 5, there is shown, in block diagram form, the coherent detection receiver circuit 16 for demodulating full-duplex quadrature amplitude modulation signals. The coherent receiver circuit 16 receives on terminal 85 the analog doubled-side band suppressed carrier quadrature amplitude modulated signal which contains data information at 1205 bps from the band pass filter 27. The signal at terminal 85 is always at the carrier frequency of $F_1$ for the reasons previously given with regard to the explanation of FIG. 2, and in particular, due to the operation of the heterodyne modulator 26 and band pass filter 27, the latter being centered at $F_1$.

The coherent detection receiver circuit 16 includes a carrier recovery circuitry portion 86 and a clock recovery circuitry 87. These portions of the circuit together with a decoder serve to invert the action of the transmitter 14 by separating the received signals into sine and cosine channels at one-half the received bit rate and thence to recover the carrier and the clock signals and to decode and combine the two sine and cosine signals to derive the synchronized output data at 1205 bps.

More specifically, the analog 1205 bps input data is received on terminal 85 and fed to the input of sine and cosine channels 96 and 97. Each of the sine and cosine channels 96 and 97 includes a series of similar elements performing similar functions. More specifically, each includes a square wave modulator 98 and 99, respectively. The sine channel square wave modulator 98 is fed with a pair of square wave sine carrier inputs of 0° and 180° relative phase at the low band carrier frequency $F_1$ as derived from a pair of outputs 101 and 102 of a Johnson counter 100 which serves to divide by four the output of a square wave voltage controlled oscillator 103 operating at $4F_1$ to produce the four quadrature phase outputs 101, 102, 104 and 105. Outputs at terminals 104 and 105 correspond to the square wave cosine carrier outputs at +90° and −90° relative phase, respectively.

Square wave modulators 98 and 99 (sometimes called four quadrant multipliers) operate to multiply the analog input signal and its inverse by the respective square wave carrier to derive lower side band sine and cosine products in channels 96 and 97, respectively. More particularly, the sine channel square wave modulator 98 alternately selects the analog input signal or its inverse, as inverted by inverter 89, at the $F_1$ carrier frequency. Similarly, the cosine channel square wave modulator 99 alternately selects the analog input signal or its inverse, as inverted by inverter 91, at the carrier frequency $F_1$. The switching waveform on the cosine channel square wave modulator 99 is 90° ahead of that on the sine channel modulator 98. The square wave modulators 98 and 99 operate as multipliers and thus produce in their outputs upper and lower side bands centered at $2F_1$ and 0, respectively. The respective lower side band contains the same information as was originally derived at the output of low pass filters 64 and 65, respectively, in the sine and cosine channels of the transmitter 14.

The sine and cosine outputs of the modulators 98 and 99, respectively, are fed through low pass filters 106 and 107, respectively, to eliminate unwanted upper side band components above 500 Hz and their outputs are thence fed to limiters 108 and 109 which serve as analog-to-digital converters for converting the sine and cosine signals into digital bits, i.e., 1's and 0's which are thence fed into two bit shift registers 111 and 112, respectively.

Figure 6:
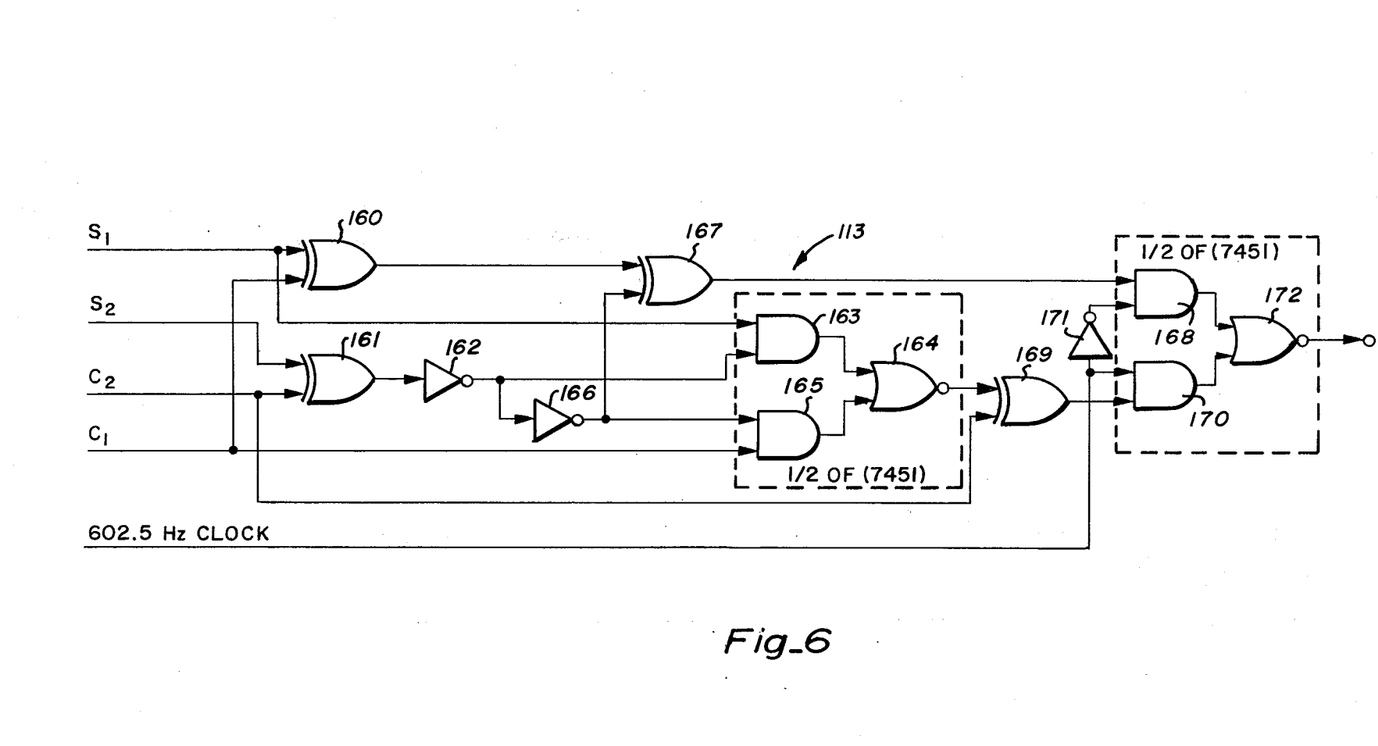
FIG. 6 is a schematic circuit diagram of a portion of the circuit of FIG. 5 delineated by line 6—6.

The outputs of the two bit shift registers 111 and 112, two outputs for the sine channel 96, two for the cosine channel 97, and a recovered dibit clock signal, are thence fed to the five input terminals of a differential four phase decoder 113, shown in greater detail in FIG.

6. The differential four phase decoder 113 operates to decode and combine the two parallel 602.5bps sine and cosine bit streams into a serial stream at 1205 bps. This stream is equivalent to the transmit data of the remote modem. This bit stream is thence fed into a flip-flop 114 which is clocked via a 1205 Hz clock signal derived from clock 92 to the demodulated output terminal 115 of the receiver 16.

The carrier frequency is recovered by multiplying an analog output A $(c)$ of the cosine low pass filter 107 with the digital outputs s of the sine channel limiter 108 in multiplier 116 to derive a product s.A $(c)$. Likewise, the analog sine output A $(s)$ of the low pass filter 106 is multiplied in multiplier 117 with a digital cosine output c derived from the output of the cosine limiter 109 to derive a second product c.A $(s)$. The two products at the output of multipliers 116 and 117 are subtracted in subtractor 118 to derive a DC error signal which is thence fed to a low pass filter and amplifier 119. The output of the amplifier 119 is a phase error control fed to the voltage control terminal of the voltage control square wave oscillator 103 operating at $4F_1$ for controlling the frequency thereof.

The clock signal is recovered in the clock recovery circuitry 87 by full wave rectifying the analog signals in the sine and cosine channels 96 and 97, as derived from the output of the low pass filters 106 and 107, respectively. The outputs of the full wave rectifiers 121 and 122 are fed to a summer 123 to derive the summation of the two signals. The summation output signal of 123 is fed to one input of a multiplier 124 with the 602.5 Hz reference signal derived from the square wave oscillator 92 via a divider 125. The output of the multiplier 124 is fed through a low pass filter and amplifier 126 to provide a DC phase error signal for controlling the frequency of the square wave voltage controlled oscillator 92.

An energy detect output (see FIG. 5) is derived from the output of the summer 123 in the clock recovery circuit 87 via line 132 which is thence fed to an integrator 133 for integration to provide the energy detect output. A received line signal detect output is derived from a latch circuit 134 which is set by the output energy detect and steady mark logic circuit 135. Logic circuit 135 consists of a timer plus an AND gate. The timer circuit receives an input from output line 115 and delivers a true output to the AND gate when the input has been an uninterrupted "mark" signal for a given duration of time, such as 20 milliseconds. The other input to the AND gate is the energy detect signal. The latch 134 is reset by loss of the energy detect signal.

In remote test, the initiating modem, such as modem 11, sends a signal that instructs the responding modem 12 to loop its received data back to the initiating modem 11. More specifically, the initiating modem 11 either manually activated or in response to an instruction from a terminal, automatically squelches its transmitter 14 via the squelch input 131 (see FIG. 2) for a suitable period of time such as 50 milliseconds and turns off receipt of input data to be transmitted. At the responding modem 12, the responding modem loses an energy detect output and a received line signal detect output.

Next, the initiating modem 11 releases the squelch and the transmitter is turned on to transmit a certain pattern of bits, namely, alternate mark and space, i.e., 1, 0, 1, 0 for 150 milliseconds. The responding modem detects in a mark-space detector 136 the uninterrupted mark-space signal for 150 milliseconds and feeds an output to one input of a start loop back logic circuit 137. An energy detect output, restored by receipt of the transmitted mark-space pattern, is also fed to a second input of the start loop back circuit 137. The received line signal detect output of latch 134 (which is now lost) is a third input to the start loop back circuit 137. The presence of energy detect, mark-space, and the loss of received line signal detect to the start loop back circuit 137 initiates the start loop back output of circuit 137 which is thence fed to a loop back flip-flop 138 and sets it for an output at 139, so long as an energy detect input is present at the second input to the loop back flip-flop 138. The 139 loop back output and its inverse 139' as derived from an inverter 141 are fed to a dual 2-line-to-1-line multiplexer 142 at the input to the transmitter 14 (see FIG. 4) to switch the received data from line 115 to the input of shift register 45 and to switch the received clock from 92 to the shift register 45 and to the divider 58. The dual 2-line-to-1-line multiplexer 142 is physically realized by a type 7451 integrated circuit commercially available from National Semiconductor, Inc. of Santa Clara, Calif. The 7451 is connected as follows: input 115 to pin 1, input 36 to pin 10, input 139' to pins 9 and 5, input 139 to pins 13 and 3, input 92 to pin 2, input 39 to pin 4 and transmit data is derived from pin 8, whereas transmit clock is derived from pin 6. Inverters 143 and 144 are for the purpose of restoring the polarity of the switched signals to that appearing at the inputs of circuit 142.

A received line signal detect output of latch 134 is fed to the set input of received data flip-flop 114 such that an absence of received line signal detect clamps the receive data output of the flip-flop 114 in the steady mark state.

Next, the transmitter of the initiating modem transmits a steady mark pattern for 200 milliseconds which is received in the responding modem and reestablishes through logic circuits 135 and 134 a received line signal detect signal. This unclamps the received data flip-flop 114 which allows the received data to be looped back to the initiating modem via the transmitter of the responding modem.

The initiating modem then turns on a sequence of test data which is looped back from the responding modem to the receiver of the initiating modem wherein it is received for comparison with the transmitted data. The test is finished by squelching the transmitter in the initiating modem via the squelch input at 131. The responding modem detects a loss of energy detect signal and a loss of received line signal detect. The loss of energy detect resets the loop back flip-flop 138 to disestablish the loop back condition and reestablishes the initial connections of the outputs of the asynchronous-to-synchronous converter 18 to the inputs to the transmitter 14 via the switching circuit 142. Thus, in the remote test, the entire communication system is tested without the provision of an operator at the remote location.

In the communication system of the present invention, the transmitter and receiver have been described utilizing a transmitter for synchronously transmitting and a receiver for coherently demodulating double-side band suppressed carrier quadrature amplitude modulated data. While this is a preferred embodiment, other methods of synchronous transmission and coherent detection may also be employed to advantage in the present invention. More particularly, such methods of modulation include, for example, four level frequency modulation, duo binary frequency modulation, single side band amplitude modulation, and double side band suppressed carrier partial amplitude response modulation. These modulation schemes are described in a text titled, Principles of Data Communication, published in 1968 by McGraw-Hill, Inc. (see pages 226–231, pages 220–221, pages 170–174, and pages 83–88, respectively).

Referring now to FIG. 6 there is shown an electrical circuit for the differential four phase decoder 113. More particularly, the circuit includes two pairs of sine and cosine inputs $s_1$, $s_2$, $c_1$ and $c_2$, respectively, which correspond to the same information found in the sine and cosine channels of the transmitter 14 at the output of the flip-flops 56 and 57, respectively. The purpose of the decoder 113 is to invert this coded information and convert it to an uncoded bit stream at 1205 bps corresponding to the input bit stream to the transmitter 14.

The $s_1$ and $c_1$ lines are inputted to an exclusive OR gate 160 which gives a logic 1 output whenever the two inputs are different and a logic 0 output whenever the two inputs are the same. Similarly, the $s_2$ and $c_2$ lines are inputted to a second exclusive OR gate 161. One output of gate 161 is thence fed via an inverter 162 to the input of an AND gate 163 for anding with a $s_1$ input to derive an output which is fed to one input of a NOR gate 164. The other input of the NOR gate 164 is derived from the output of a second AND gate 165 to which an output of the inverter 162 is fed as further inverted by a second inverter 166. This inverted input to AND gate 165 serves as a steering input, for steering a $c_1$ input through the second AND gate 165 to the second input of the NOR gate 164.

The inverted steering output of inverter 166 is also fed to one input of an exclusive OR gate 167 for inputting with the output of the exclusive OR gate 160 to derive an output which is fed to one input of an AND gate 168. Similarly, this inverted output of the NOR gate 164 is fed to one input of an exclusive OR gate 169 for inputting with a $c_2$ input to derive an output which is fed to one input of a second AND gate 170. The inputs to AND gate 168 and 170 are alternately steered therethrough via clock signals derived from divider 125. One of these clock signals is inverted via inverter 171. The outputs from AND gates 168 and 170 are combined in an inverted NOR gate 172 to derive the decoded output bit stream at 1205 bps which is thence fed to flip-flop 114. AND gates 163, 165, 168, and 170 together with inverted NOR gates 164 and 172 are physically realized, in a preferred embodiment, by utilizing both halves of a type 7451 integrated circuit.

Synchronous encoding and modulation as used herein means that changes in the transmit data and resultant changes in the transmitted carrier may occur only at regular intervals of time as defined by a transmit clock signal.

Coherent detection or coherent demodulation as used herein means that a carrier signal is recreated in the receiver and the information in the received signal is extracted by referring the signal to the recreated carrier.

What is claimed is:

1. In a full-duplex modem for communicating over a two wire circuit;
    transmitter means to be connected to the two wire circuit for transmitting a data stream thereover at a first carrier frequency;
    receiver means to be connected to the same two wire circuit at the location of said transmitter means for receiving a data stream thereover at a second carrier frequency simultaneously with transmission of data by said transmitter means;
    said transmitter means including means for synchronously encoding and modulating the data of the data stream to be transmitted at the first carrier frequency; and
    said receiver means including means for coherently detecting the data in the data stream received at the second carrier frequency.

2. The apparatus of claim 1 wherein, said transmitter means includes means for transmitting the data stream onto the two wire circuit as double side band suppressed carrier quadrature amplitude modulation.

3. The apparatus of claim 1 wherein, the data stream received over the two wire circuit is double side band suppressed carrier quadrature amplitude modulation and said receiver means includes, means for coherently demodulating the received doubleside band suppressed carrier quadrature amplitude modulation to derive a received data output.

4. The apparatus of claim 1 wherein, said transmitter and receiver means include means for transmitting the data and coherently demodulating the data, respectively, as four level frequency modulation.

5. The apparatus of claim 1 wherein, said transmitter and receiver means include means for transmitting and coherently detecting the data, respectively, as duo binary frequency modulation.

6. The apparatus of claim 1 wherein, said transmitter means and said receiver means include means for transmitting and coherently detecting the data, respectively, as single side band amplitude modulation.

7. The apparatus of claim 1 wherein, said transmitting means and said receiving means include means for transmitting and coherently detecting the data, respectively, as double side band suppressed carrier partial amplitude response modulation.

8. The apparatus of claim 1 including means for receiving asynchronous data and for converting said asynchronous data to the synchronously encoded and modulated data before transmission thereof by said transmitter means.

9. The apparatus of claim 1 wherein, said receiver means includes, band pass filter means tuned to pass a band of frequencies about a carrier frequency to be demodulated, and means for heterodyning the received data stream at a modulated carrier frequency to be received with a reference signal of a frequency to produce a difference frequency band centered at the frequency of the band pass filter, and means for feeding the modulated difference frequency band through said band pass filter means.

10. The apparatus of claim 9 including, means for shifting the frequency of the reference signal between 0 frequency and a frequency equal to the sum of the first and second carrier frequencies to switch said receiver means for receiving the first or second carrier frequencies, respectively.

11. In a full-duplex modem for communicating over a two wire line;
    a first full-duplex modem means for simultaneously transmitting and receiving data streams in opposite directions over a two wire circuit;
    said first modem means including means for sending a test signal over said two wire circuit to instruct a second modem at a remote terminal on said two wire circuit to automatically loop its received data back to said first modem over said two wire circuit; and said first modem including means for receiving and demodulating the looped back data received over said two wire circuit for comparison with the transmitted data received over said two wire circuit to verify proper operation of the communication system.

12. In a full-duplex modem for communicating over a two wire circuit;

a first full-duplex modem means for simultaneously transmitting and receiving data streams in opposite directions over a two wire circuit; and said first modem including means responsive to receipt of a test signal instruction, as transmitted over said two wire circuit from a second modem at a remote terminal on said two wire circuit, for automatically demodulating and retransmitting the received data back to said second modem over said two wire circuit.

\* \* \* \* \*